United States Patent
Shankar Iyer et al.

(10) Patent No.: US 11,159,611 B2
(45) Date of Patent: Oct. 26, 2021

(54) SYSTEM AND METHOD FOR LEADER ELECTION FOR DISTRIBUTED SYSTEMS

(71) Applicant: KRYPC CORPORATION, New Brunswick, NJ (US)

(72) Inventors: Subramanian Ravi Shankar Iyer, Bangalore (IN); Sai Ganesh Muthuraman, Chennai (IN); Seenivasan Subramani, Chennai (IN); Ravi Jagannathan, Seattle, WA (US)

(73) Assignee: KRYPC CORPORATION, New Brunswick, NJ (US)

( * ) Notice: Subject to any disclaimer, the term of this patent is extended or adjusted under 35 U.S.C. 154(b) by 365 days.

(21) Appl. No.: 16/452,359

(22) Filed: Jun. 25, 2019

(65) Prior Publication Data

US 2020/0076888 A1 Mar. 5, 2020

(30) Foreign Application Priority Data

Aug. 31, 2018 (IN) .............................. 201841032746

(51) Int. Cl.
*H04L 29/08* (2006.01)
*H04L 9/06* (2006.01)

(52) U.S. Cl.
CPC ........ *H04L 67/1051* (2013.01); *H04L 9/0643* (2013.01); *H04L 67/1055* (2013.01); *H04L 67/1091* (2013.01); *H04L 2209/38* (2013.01)

(58) Field of Classification Search
CPC ... H04L 9/0643; H04L 9/3239; H04L 9/3247; H04L 67/1051; H04L 67/1091; H04L 67/1055; H04L 2209/38
See application file for complete search history.

(56) References Cited

U.S. PATENT DOCUMENTS

| | | | |
|---|---|---|---|
| 6,687,847 B1 * | 2/2004 | Aguilera | G06F 11/0715 714/15 |
| 9,400,607 B1 * | 7/2016 | Daud | H04L 67/1095 |
| 9,817,703 B1 * | 11/2017 | Ryland | G06F 9/52 |
| 2009/0165018 A1 * | 6/2009 | Junqueira | G06F 9/5061 719/313 |
| 2018/0295546 A1 * | 10/2018 | Crawford | H04W 36/0083 |

* cited by examiner

*Primary Examiner* — Clayton R Williams
*Assistant Examiner* — Michael Li
(74) *Attorney, Agent, or Firm* — Barry Choobin; Patent 360LLC

(57) ABSTRACT

The embodiment herein provides a system and method for providing a novel leader election mechanism in distributed systems that is randomized in twin dimensions of space and time using the concept of a colliding random walk (CRW). Leader election is randomized in space in terms of the node identified as the leader and the time taken to identify the leader. A source node is enabled to generate left and right coupons in a quantum resistant manner for random walks. A novel fault tolerance mechanism is provided to identify several leaders for same set of coupons. In this system and method, the source vertex generates multiple CRWs for each piece of work that needs to be done. The fault tolerance mechanism reduces the time to collision, increases the number of leaders and also offers increased resilience and tolerance to faults.

11 Claims, 9 Drawing Sheets

SYSTEM AND METHOD FOR LEADER ELECTION FOR DISTRIBUTED SYSTEMS

CROSS-REFERENCE TO RELATED APPLICATIONS

The embodiments herein claim the priority of the Indian Provisional Patent Application No. 201841032746 filed on Aug. 31, 2018 with the title "A SYSTEM AND METHOD FOR LEADER SELECTION FOR DISTRIBUTED SYSTEMS", and the contents of which is included entirely as reference herein.

BACKGROUND

Technical Field

The embodiments herein are generally related to the field of distributed systems. The embodiments herein are more particularly related to a system and method for providing a faster, lightweight and tan mechanism for leader election in distributed systems using colliding random walks.

Description of the Related Art

A distributed system is a system whose components are located on different networked computers (possibly in disparate geographical locations) which communicate and coordinate their actions by passing the messages to each other. The networked computers in distributed system are typically called nodes or peers which interact with each other to achieve a common goal. Peer-to-peer (P2P) computing or networking is a class of distributed applications that partitions tasks or workloads between peers. One such P2P system is Blockchain which is a decentralized peer-to-peer system. In Blockchain, transaction information is collected and encapsulated in a digital envelope called "block" and this block is then cryptographically added to the end of a chain of other transactions. For this type of decentralized systems to make decisions (selecting leader on ordering of transactions), the nodes need to come to a consensus using a consensus mechanism.

In case of blockchains, leader election happens for every block. The consensus mechanism for blockchains primarily focuses on who creates the block. Thus, the performance of consensus algorithms in blockchain is often limited by a speed of leader election. There are several consensus mechanisms suggested in the art for this purpose. Some of the commonly used consensus mechanisms include Paxos and Raft, Proof of Work (PoW), Proof of Stake (PoS), Delegated Proof of Stake, Proof of Importance, mining diversity. Proof of Authority (PoA), Proof of Activity, Proof of Space, Proof of Elapsed Time (PoET), Practical Byzantine Fault Tolerance (PBFT), Crash Fault Tolerance (XFT) in Hyperledger and Federated Byzantine Agreement.

However, performance of the consensus algorithms in decentralized distributed systems depends on the performance of the underlying leader election mechanism. An ability to elect the leaders concurrently for different transactions at a high velocity/speed in a fair and secure manner is a challenge. Most of the existing consensus algorithms are too complex and resource hungry to run on a plurality of constrained devices. Some other commonly encountered issues while using these existing consensus mechanisms include energy inefficiency, lower throughput, high latency, fairness/centralization concerns, scalability concerns, dependence on a specialized hardware from a single source etc.

Hence, there is a need for a system and method for providing a faster, lightweight and fair mechanism for leader election in distributed systems. Still further, there is a need for providing a novel leader election mechanism in distributed systems that is randomized in twin dimensions of space and time using a concept of a colliding random walk to provide a fair chance for every node to be elected as a leader. There is also a need for a system and method for a coupon generation that is more secure and quantum resistant. Still further, there is a need for providing a leader election mechanism that is fault tolerant and does not depend on a failure of one node or is tolerant to some part of the network being disconnected.

The above-mentioned shortcomings, disadvantages and problems are addressed herein and which will be understood by reading and studying the following specification.

OBJECTS OF THE EMBODIMENTS

The primary object of the embodiments herein is to provide a faster, lightweight and fair mechanism for a leader node election in distributed systems.

Another object of the embodiments herein is to provide a novel leader election mechanism in distributed systems that is randomized in the twin dimensions of space and time using the concept of a colliding random walk.

Yet another object of the embodiments herein is to provide a system and method for a coupon generation that is more secure and quantum resistant.

Yet another object of the embodiments herein is to provide a system and method for leader election in distributed systems that uses a novel fault tolerance mechanism while identifying more number of leaders for a same set of coupons.

Yet another object of the embodiments herein is to provide a system and method for leader election in distributed systems that is capable of handling large volumes of data at a high velocity/speed in real time.

Yet another object of the embodiments herein is to provide a novel fault tolerance mechanism for leader election in distributed systems to reduce the time for leader election, increase the number of leaders and also offer an increased resilience and tolerance to faults as compared to the existing solutions.

Yet another object of the embodiments herein is to provide a mechanism for leader election in distributed systems to enable a source node to generate left and right coupons in a quantum resistant manner for random walks.

These and other objects and advantages of the embodiment herein will become readily apparent from the following detailed description taken in conjunction with the accompanying drawings.

SUMMARY

The various embodiments herein provide a system for leader election in distributed networks is provided. The system comprises a peer-to-peer distributed network comprising a plurality of nodes (computing devices) connected over a communication network. Each node in the network is capable of communicating with one or more of the other nodes in the network over a bi-directional communication link. The system also comprises a coupon generation module provided in each node within the network. The coupon generation module is configured for generating one or more software coupons. Each software coupon comprises a pair of Left (L) and Right (R) coupons. Each pair of L and R coupon comprises a hash value part/match data, one or more identifiers and a hop count value. The coupon generation module is further configured for using a fault tolerant mechanism by generating more than one pair of coupons for a unit of work, and wherein each coupon generated carries a same walk identifier. The system also comprises a coupon forwarding module coupled to the coupon generation module. The coupon forwarding module is configured for initiating, a colliding random walk (CRW) by forwarding all the pairs of L and R coupons (a simple random walk (SRW)) generated by the source node by selecting two neighboring nodes at random and forwarding the L coupon to the first node and R coupon to the second node. The system further comprises a coupon processing module coupled to the coupon forwarding module. The coupon processing module is configured for processing the received L and R coupons, to identify a potential match/primary match of the L and R coupons. The coupon processing module is further configured for verifying potentially matched L and R coupons using one or more identifiers to determine an exact match/secondary match. The receiving node with exactly matched coupons is identified as a leader node and gains the right to perform a specific task.

According to one embodiment herein, a fault tolerance mechanism called as m-ling, is configured for providing an option of either increasing probability of leader election, increasing the number of leaders elected or achieve trade-off between time to leader election and number of leaders elected using one or more variants of the mechanism. The one or more variants are distinct, non-distinct and hybrid variant respectively.

According to one embodiment herein, the distinct variant of m-ling is configured for providing fair and more number of elected leaders by setting different match data in the L-coupons and corresponding match data in the R-coupons. Setting different match data in each of L and R coupons requires equal number of collisions thereby increasing the probability of leader election.

According to one embodiment herein, the non-distinct variant of in-ling is configured for increasing the probability of collision for faster leader election by setting match data in L-coupons and corresponding match data in R-coupons as identical. Setting identical match-data in L and R coupons enables any L-coupon to be matched with any R-coupon thereby increasing the probability of leader election.

According to one embodiment herein, the hybrid variant of m-ling is configured for increasing resilience and tolerance to faults and achieve trade-offs between time to leader election and number of leaders elected by setting source node/vertex to initiate a set of distinct CRWs and remaining non-distinct CRW's.

According to one embodiment herein, a method for leader election in distributed systems is provided. The method comprises the steps of selecting one or more source nodes in a distributed system and generating one or more software coupons by each source node using a coupon generation module. Each software coupon comprises a pair of Left (L) and Right (R) coupons. The method also comprises forwarding the one or more pairs of L and R coupons (SRW) generated by the source node in the network using coupon, forwarding module to neighbouring nodes by initiating a colliding random walk (CRW) for each pair. Each CRW comprises one L-coupon and one R-coupon, and wherein the L- and R-coupons corresponding to the plurality of CRW's carry a same walk identifier. The method further comprises processing the received L and R coupons at each node to identify a potential match/primary match of the coupons by comparing the received coupons and forwarding the potentially matched coupons to a matching algorithm to determine an exact match/secondary match between the L and R coupons. The method still further comprises claiming a match when L and R coupons with same walk identifier visit a node simultaneously.

According to one embodiment herein, the step of simultaneously generating multiple pairs of L and R coupons called as in-ling, further comprises distinct, non-distinct and hybrid variants. The use of distinct, non-distinct and hybrid variants increases the probability of leader election, increases the number of leaders elected and achieves trade-off between time to leader election and number of leaders elected respectively.

According to one embodiment herein, the step of generating pairs of coupons comprises setting the match data in L-coupons and corresponding match data in R-coupons as different in case of distinct variant and as identical in case of non-distinct variant.

According to one embodiment herein, the step of generating pairs of coupons using hybrid variant comprises setting source node/vertex to initiate a set of distinct CRWs and remaining non-distinct CRWs.

According to one embodiment herein, the step of coupon matching further comprises checking a hop count of each coupon and forwarding the coupon to the forwarding module when the hop count is less than a minimum number of hops specified in the coupon structure; dropping the coupon when the bop count is greater than the maximum number of hops specified in the coupon structure; checking the coupon for primary match when the coupon is not dropped; sending die coupon to the forwarding module when the hop count is less than the minimum number of hops specified in the coupon structure or the primary match is not found; checking the coupon for secondary match when the primary match is found; sending the coupon to forwarding module when the secondary match is not found and claiming a match when secondary match is found and forwarding the coupon to application layer for further processing.

The various embodiments herein provide a novel leader node election mechanism for use in a distributed system that is randomized in twin dimensions of space and time using a concept of a colliding random walk. The consensus mechanism of the embodiments herein are referred to as "Proof-of-Match Adaptive" (PoMA)) mechanism hereinafter in the disclosure. The PoMA mechanism is configured to implement an algorithm for handling large volume of data, high rate of data transfer and large varieties of data that are expected to be handled in distributed systems, such as blockchains, required for an implementation of business applications (e.g. using IoT devices, online retail etc.) on a large scale.

According to one embodiment herein, a method for leader election in distributed systems is provided. The method comprises the steps of selecting a source node in a distributed system. The method also comprises generation of L and R coupons by the source node using a coupon generation module. The method further comprises forwarding the coupons to the neighbouring nodes for a CRW and claiming a match when two SRWs visit the same vertex simultaneously. The method still further comprises electing the node claiming the match as a leader.

According to one embodiment herein, in Proof-of-Match Adaptive, a node (source vertex) that needs to accomplish a task generates two coupons (a pair of Simple Random Walks (SRW)) namely left coupon (L-coupon) and right coupon (R-coupon) using a coupon generation module. The source node then initiates a colliding random walk on the network using these L and R coupons. These coupons are forwarded in the network using the coupon forwarding module to the neighbouring nodes. When the two SRWs visit the same vertex simultaneously, the receiving node claims a collision or match and the SRWs are terminated. Such a receiving node is then identified as a leader and gains the right to perform a specific task. The task of coupon matching is performed using a coupon matching module.

According to one embodiment herein, the mechanism allows variants of this form for generating and forwarding coupons from a source vertex. The source vertex also uses a novel fault tolerance mechanism referred to as "m-ling", herein after, in the present disclosure. In m-Ling a source vertex is configured for generating multiple CRWs for each piece of work that needs to be completed (e.g., each set of transactions to be processed). Thus, instead of initiating one CRW for each piece of work that needs to be done, in m-Ling, m (m>1) simultaneous CRWs are initiated by the source vertex. All the coupons (L- and R-coupons) carry the same walk identifier.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
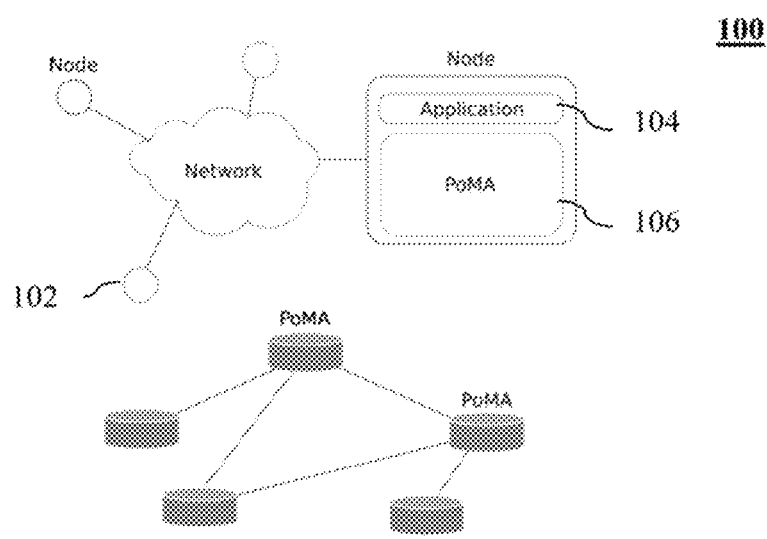
FIG. 1 illustrates a block diagram of a distributed system, according to an embodiment herein.

Although the specific features of the embodiment herein are shown in separate drawings, it is done for convenience only as each feature may be combined with any or all of the other features in accordance with the embodiment herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system for leader election in distributed networks is provided. The system comprises a peer-to-peer distributed network comprising a plurality of nodes (computing devices) connected over a communication network. Each node in the network is capable of communicating with one or more of the other nodes in the network over a bi-directional communication link. The system also comprises a coupon generation module provided in each node within the network. The coupon generation module is configured for generating one or more software coupons. Each software coupon comprises a pair of Left (L) and Right (R) coupons. Each pair of L and R coupon comprises a hash value part match data, one or more identifiers and a hop count value. The coupon generation module is further configured for using a fault tolerant mechanism by generating more than one pair of coupons for a unit of work, and wherein each coupon generated carries a same walk identifier. The system also comprises a coupon forwarding module coupled to the coupon generation module. The coupon forwarding module is configured for initiating a colliding random walk (CRW) by forwarding all the pairs of L and R coupons (a simple random walk (SRW)) generated by the source node by selecting two neighbouring nodes at random and forwarding the L coupon to the first node and R coupon to the second node. The system further comprises a coupon processing module coupled to the coupon forwarding module. The coupon processing module is configured for processing the received L and R coupons to identify a potential match/primary match of the L and R coupons. The coupon processing module is further configured for verifying potentially matched L and R coupons using one or more identifiers to determine an exact match/secondary match. The receiving node with exactly matched coupons is identified as a leader node and gains the right to perform a specific task.

According to one embodiment herein, a fault tolerance mechanism called as m-ling, is configured for providing an option of either increasing probability of leader election, increasing the number of leaders elected or achieve trade-off between time to leader election and number of leaders elected using one or more variants of the mechanism. The one or more variants are distinct, non-distinct and hybrid variant respectively.

According to one embodiment herein, the distinct variant of m-ling is configured for providing fair and more number of elected leaders by setting different match data in the L-coupons and corresponding match data in the R-coupons. Setting different match data in each of L and R coupons requires equal number of collisions thereby increasing the probability of leader election.

According to one embodiment herein, the non-distinct variant of m-ling is configured for increasing the probability of collision for faster leader election by setting match data in L-coupons and corresponding match data in R-coupons as identical. Setting identical match-data in L and R coupons enables any L-coupon to be matched with any R-coupon thereby increasing the probability of leader election.

According to one embodiment herein, the hybrid variant of m-ling is configured for increasing resilience and tolerance to faults and achieve trade-offs between time to leader election and number of leaders elected by setting source node vertex to initiate a set of distinct CRWs and remaining non-distinct CRW's.

According to one embodiment herein, a method for leader election in distributed systems is provided. The method comprises the steps of selecting one or more source nodes in a distributed system and generating one or more software coupons by each source node using a coupon generation module. Each software coupon comprises a pair of Left (L) and Right (R) coupons. The method also comprises forwarding the one or more pairs of L and R coupons (SRW) generated by the source node in the network using coupon forwarding module to neighbouring nodes by initiating a colliding random walk (CAW) for each pair. Each CRW comprises one L-coupon and one R-coupon, and wherein the L- and R-coupons corresponding to the plurality of CRW's carry a same walk identifier. The method further comprises processing the received L and R coupons at each node to identify a potential match/primary match of the coupons by comparing the received coupons and forwarding the potentially matched coupons to a matching algorithm to determine an exact match/secondary match between the L and R coupons. The method still further comprises claiming a match when L and R coupons with same walk identifier visit a node simultaneously.

According to one embodiment herein, the step of simultaneously generating multiple pairs of L and R coupons called as nor-ling, further comprises distinct, non-distinct and hybrid variants. The use of distinct, non-distinct and hybrid variants increases the probability of leader election, increases the number of leaders elected and achieves trade-off between time to leader election and number of leaders elected respectively.

According to one embodiment herein, the step of generating pairs of coupons comprises setting the match data in L-coupons and corresponding match data in R-coupons as different in case of distinct variant and as identical in case of non-distinct variant.

According to one embodiment herein, the step of generating pairs of coupons using hybrid variant comprises setting source node vertex to initiate a set of distinct CRWs and remaining non-distinct CRW's.

According to one embodiment herein, the step of coupon matching further comprises checking a hop count of each coupon and forwarding the coupon to the forwarding module when the hop count is less than a minimum number of hops specified in the coupon structure; dropping the coupon when the hop count is greater than the maximum number of hops specified in the coupon structure; checking the coupon for primary match when the coupon is not dropped; sending the coupon to the forwarding module when the hop count is less than the minimum number of hops specified in the coupon structure or the primary match is not found; checking the coupon for secondary match when the primary match is found; sending the coupon to forwarding module when the secondary match is not, found and claiming a match when secondary match is found and forwarding the coupon to application layer for further processing.

The various embodiments herein provide a novel leader node election mechanism for use in a distributed system that is randomized in twin dimensions of space and time using a concept of a colliding random walk. The consensus mechanism of the embodiments herein are referred to as "Proof-of-Match Adaptive" (PoMA) herein after in the disclosure. The PoMA implements an algorithm for handling a large volume of data, a high rate of data transfer, and a large varieties of data, that are expected to be handled in distributed systems, such as blockchains, required for an implementation of business applications using IoT devices on a large scale.

According to one embodiment herein, the system comprises a Peer-to-Peer distributed network of a plurality of nodes computing devices) connected over a communication network. Each node in the distributed network comprises the application layer and a Proof-of-Match Adaptive (PUMA) algorithm module. Each node in the network is capable of communicating with one or more of the other nodes in the network over communication links edges). Nodes are identified by their respective addresses in the network. Two nodes are said to be adjacent or neighbours when each one is aware of the other's address and is able to directly communicate with each other. While it is possible that communication may be one-sided, that is, one node may have the address of another but not vice-versa. In this disclosure, it is assumed that communication over an edge is bi-directional. That is, if a node v1 is the neighbour of a node v2, then v2 is also a neighbour of v1.

According to one embodiment herein, the node in the given network generates a software token called a coupon using the coupon generation module. This coupon is sent to another node chosen at random from one of its neighbors. According to one embodiment, the node for sending coupon is selected in accordance with a probability distribution such as the Uniform Distribution. The node that receives the coupon, in turn, forwards this coupon to one of the neighbors. This process of each node receiving a coupon from the neighbor and forwarding randomly to another neighboring node is termed as a Simple Random Walk (SRW). Each step of an SRW involves a coupon travelling exactly one hop to a randomly selected node. The process of a SRW begins with smile node in the network initiating the coupon forwarding process. A node initiating an SRW is called the source vertex for that SRW. The process continues until some receiving node discontinues the forwarding process (called terminating the walk) based on some pre-decided criterion such as the maximum number of hops permitted for that SRW (which is nothing but the total time coupon spent on the network).

According to one embodiment herein, the SRW is said to visit a node "v" on receiving the corresponding coupon. For non-complete connected graphs with moderate to high densities (greater than or equal to 0.4), the number of visits the SRW makes to each vertex correlates very highly with the eigenvector centrality measure of the vertex.

According to one embodiment herein, the node in a network simultaneously generates multiple simple random walks (Multiple Random Walks) during any time interval. The number of such simple random walks generated during a given time interval vary from node to node. Furthermore, any node is enabled to generate different numbers of simple random walks during different intervals of time. This allows the nodes in a network to exploit the properties of multiple random walks to optimize the performance of the distributed application running on the network. Every node in a network comprises mechanisms to manage multiple and potentially large numbers of visits in a given interval of time. Statistics like the mean arrival rate (which is the average number of coupons received by the node in a hop) and the mean collision rate (which is the number of collisions at a node in a hop) correlate highly with the eigenvector centrality measures of the nodes of the graph.

According to one embodiment herein, in traditional CRW, a source vertex initiates a pair of SRWs as explained above. The coupons of the SRW carry information such that when the two SRWs (same pair) visit a particular node/vertex simultaneously the receiving node claims a collision or match and the SRWs are terminated. Such a receiving node is then identified as a leader and gains the right to perform a specific task. As the walks follow random paths, such a process ensures fairness.

According to one embodiment herein, a variant of CRW is the Path-Colliding Random Walk (PCRW). In a PCRW, a collision is said to happen if a coupon visits a node previously visited by its complementary coupon. A restriction on such a colliding random walk is the k-PCRW. In such PCRW, a collision is said to happen only if a coupon visits a node among the last k nodes visited by its complementary coupon. For example, a 2-PCRW is a PCRW, in which a collision is said to happen only if a coupon visits one of the last 3 nodes (last two nodes+the current node) visited by its complementary coupon. The term "PCRW", without a qualifier indicates a Path Colliding Random Walk in which there is no restriction on the number of nodes in the path of a coupon to be considered for a collision.

According to one embodiment herein, in Proof-of-Match Adaptive, a node (source vertex) that needs to accomplish a task generates two coupons (a pair of Simple Random Walks (SRW)) namely left coupon (L-coupon) and right coupon (R-coupon) using a coupon generation module. The source node then initiates a set of colliding random walks on the network using these L and R coupons. These coupons are forwarded in the network using forwarding module to the neighbouring nodes. When the two SRWs visit the same vertex simultaneously, the receiving node claims a collision or match and the SRWs are terminated. Such a receiving node is then identified as a leader and gains the right to perform a specific task. The task of coupon matching is performed using a coupon matching module.

According to one embodiment herein, a method for leader election in distributed systems is provided. The method comprises the steps of selecting a source node in a distributed system. The method also comprises generation of L and R coupons by the source node using a coupon generation module. The method further comprises forwarding the coupons to the neighbouring nodes for a CRW and claiming a match when two SRWs visit the same vertex simultaneously. The method still further comprises electing the node claiming the match as a leader.

According to one embodiment of the embodiment herein, the mechanism allows for generating coupons and forwarding coupons in a plurality of ways/processes. The source vertex also uses a novel fault tolerance mechanism referred to as "m-ling", herein after, in the present disclosure. In m-Ling, a source vertex is configured for generating multiple CRWs for each piece of work that needs to be completed (e.g., each set of transactions to be processed). Thus, instead of initiating one CRW for each piece of work that needs to be done, in m-Ling, m (m>1) simultaneous CRWs are initiated by the source vertex. All the coupons (L- and R-coupons) carry the same walk identifier.

FIG. 1 illustrates a top level architecture diagram of a distributed system, according to one embodiment herein. With respect to FIG. 1, the system comprises a Peer-to-Peer distributed network of a plurality of nodes 102 (computing devices) connected over a communication network. Each node in the distributed network comprises the application layer 104 and a Proof of Match Adaptive Algorithm (PoMA) module 106.

Figure 2:
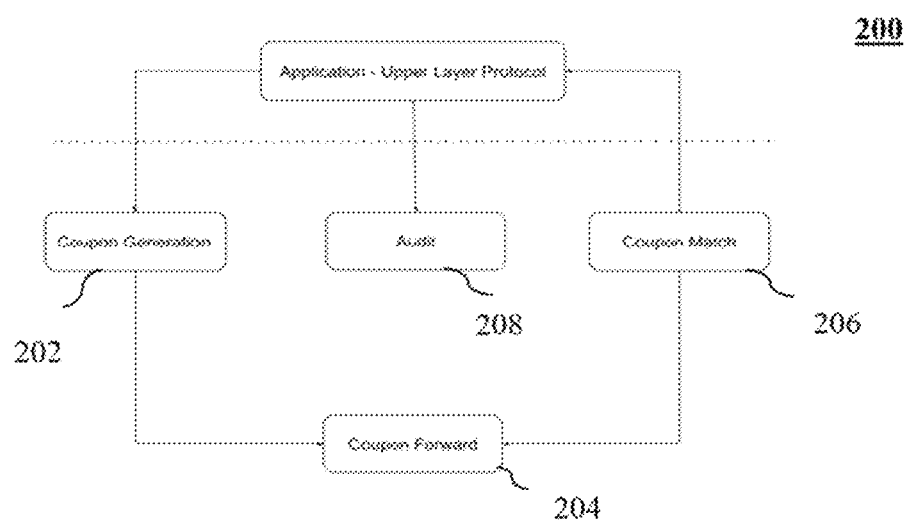
FIG. 2 illustrates a block diagram of a node in a distributed system that uses colliding random walks (CRW) for leader election, according to one embodiment herein.

FIG. 2 illustrates a block diagram of a node in a distributed system that uses colliding random walks (CRW) for leader election, according to one embodiment herein. With respect to FIG. 2, each PoMA module 108 further comprises the coupon generation module 202, the coupon forwarding module 204, the coupon matching module 206 and the audit module 208. According to one embodiment of the embodiment herein, the various modules present in the system can be implemented using software, hardware or a combination thereof.

Figure 3:
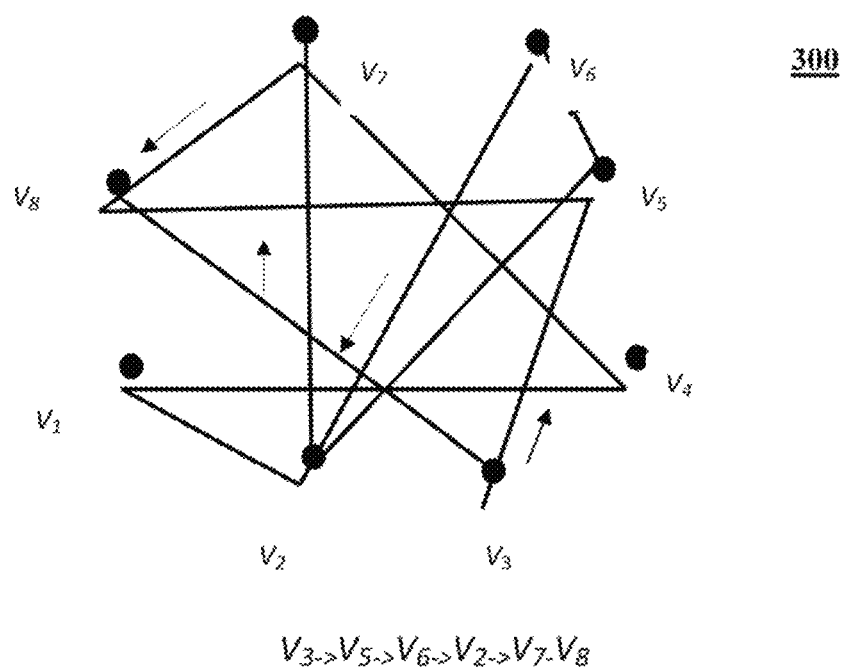
FIG. 3 illustrates a schematic representation of SRW, according to one embodiment herein.

FIG. 3 illustrates a schematic representation of SRW, according to one embodiment herein. With respect to FIG. 3, the source node v3 generates coupon and forwards to neighbor v5 that in-turn forwards to v6 and so on. The SRW of coupon travels from v3-v5-v6-v2-v7-v8.

Figure 4:
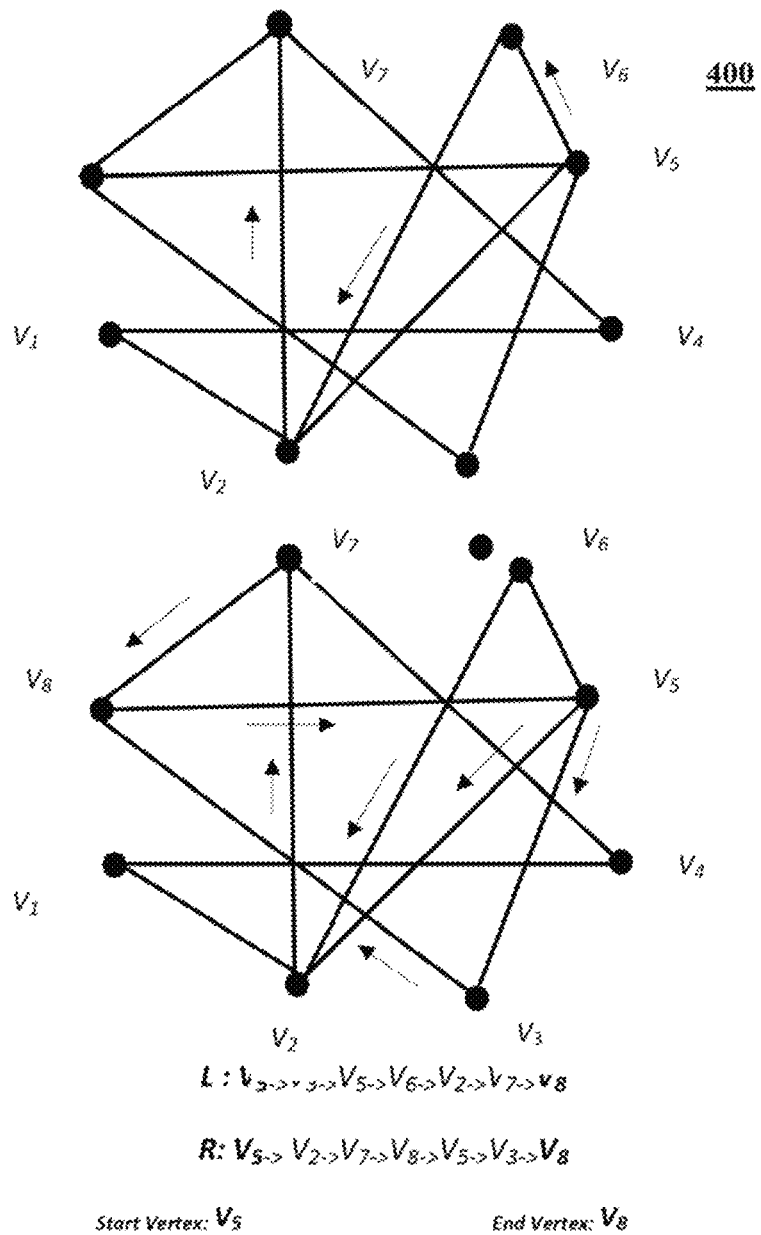
FIG. 4 illustrates a schematic representation of CRW, according to one embodiment herein.

FIG. 4 illustrates a schematic representation of CRW, according to one embodiment of the embodiment herein. With respect to FIG. 4, v5 is a starting vertex and v8 is a collision vertex. Thus, v8 becomes a leader. As the walks follow random paths such a process ensures fairness.

Figure 5:
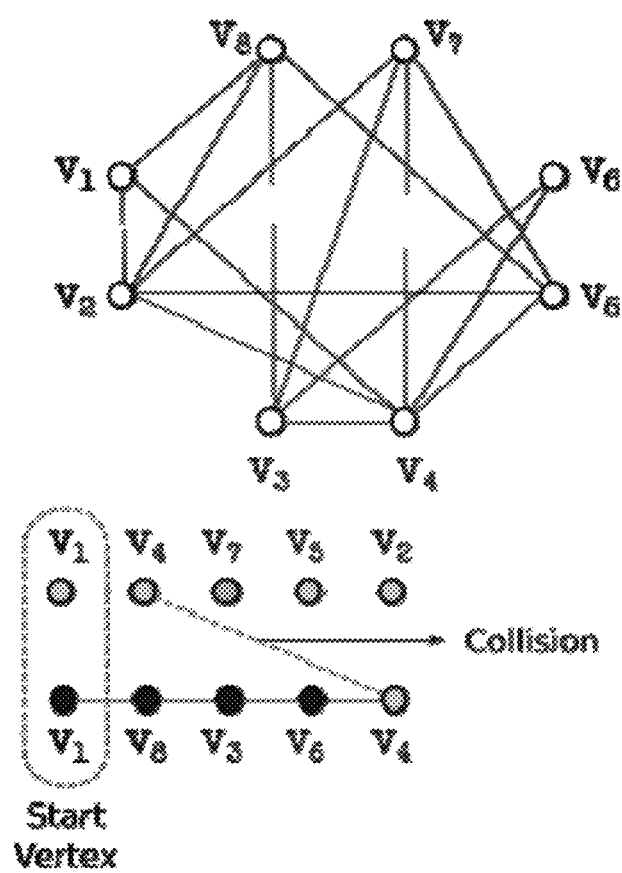
FIG. 5 illustrates a schematic representation of PCRW, according to one embodiment herein.

FIG. 5 illustrates a schematic representation of PCRW, according to one embodiment herein. With respect to FIG. 5, the two SRWs illustrating a PCRW are illustrated in gray and black. The collision occurs when the black coupon visits v4, which was the first vertex, after the source vertex, visited by the gray coupon. Unless made explicit, the term "CRW" hereinafter is used to refer collectively to both types of CRW.

Figure 6:
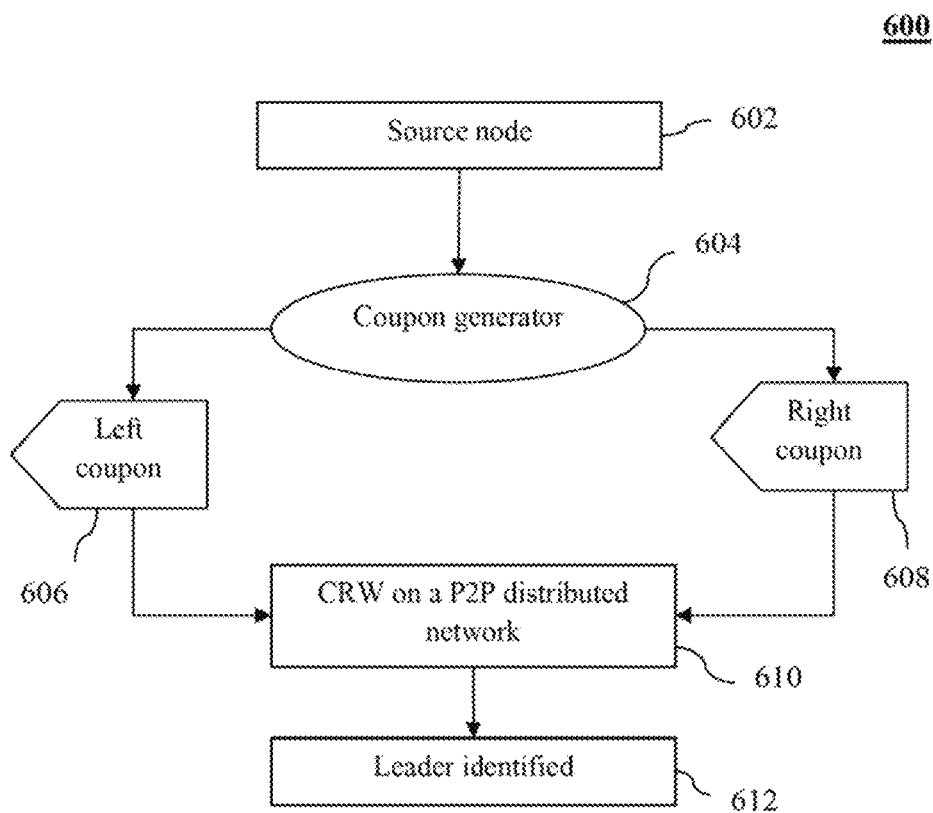
FIG. 6 illustrates a flowchart explaining a method of leader election in distributed system, according to one embodiment herein.

FIG. 6 illustrates a flowchart depicting a method for leader election, according to one embodiment herein. With respect to FIG. 6, a source node is selected (602). The source node then using coupon generator module (604) generates L and R coupons (606 and 60S). After coupon generation, CRW is initiated on P2P distributed network (610) and a leader is identified on successful coupon matching (612).

Figure 7:
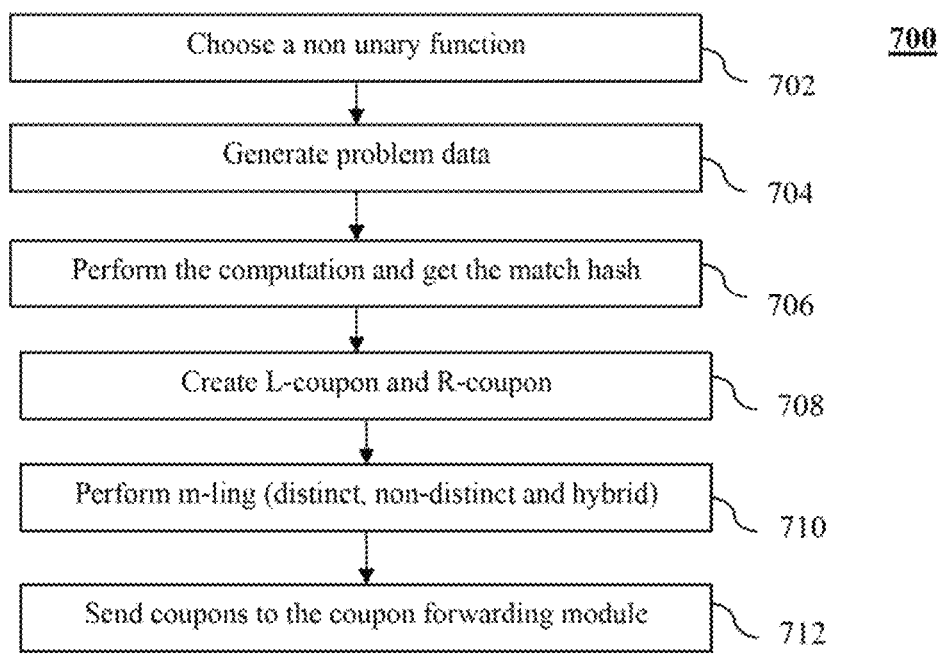
FIG. 7 illustrates a flowchart explaining a method of coupon generation, according to one embodiment herein.

FIG. 7 illustrates a flowchart explaining the method of coupon generation, according to one embodiment herein. With respect to FIG. 6, the method comprises choosing a non unary function (702) and generating problem data (704). The method also comprises performing the computation and getting the match hash (706). The source node in a CRW generates a pair of coupons (708). These coupons are referred to as the Left- or L-coupon and the Right- or R-coupon. Every CRW comprises exactly one L-coupon and one R-coupon. The SRW with the coupon is called the L-coupon is called L-SWR, and the SRW with the R-coupon is called the R-SRW. The source vertex generates two SRWs for each CRW that it initiates.

According to one embodiment herein, each coupon generated by the source node has a particular structure. In one example embodiment, the coupon structure is as follows. A Coupon type is defined for each coupon. This is done by setting L-coupon to 1 and R-coupon to 0. The L-coupon comprises a code implementing a non-unary function that takes at least two parameters as input. The R-coupon comprises of data corresponding to the code contained in the IL-coupon. A hash of the expected result is generated using a Cryptographic Hash Algorithm such as MD5 or SHA-256. This value is referred as the "Match Hash". Any node checking to see the presence of a matching R-coupon uses only the match hash of the L-coupon. A walk identifier is also included in the coupon structure that helps in identifying the walk uniquely. In one example embodiment, the source node in a CRW generates more than two coupons. Generating more than two coupons increases the quantum resistance of the network at the cost of probability of collision there by giving the capability to configure the network based on the task and node distribution and density.

According to one embodiment herein, the coupon structure further comprises values corresponding to minimum number of hops (miniHops) and maximum number of hops (maxHops). The minimum number of hops increases the fairness of mechanism by ensuring that the SRW progresses deeper into the network. This is typically set to a small multiple of the estimated diameter of the network. Similarly, the maximum number of hops is typically set to 10 times the estimated value of the size of the network. A path list (pathList) is also provided in the coupon structure. The path list comprises a list of the signatures of each node that the SRW visits, except the node at which collision occurs. The signature of a node consists of the following concatenated information (called the visited signature:

nodeidentifier>nodesignature>

Here, the node identifier is the unique identifier of the node. The node signature facilitates an audit mechanism of the path taken by every SRW.

According to one embodiment herein, the node signature is derived as follows. Every node in the network, when comes up for the first time, generates a sequence of 10 large floating point numbers in a pre-determined range $[-2^{16}, 2^{16}-1]$. These numbers are stored persistently by the node, for use whenever the node goes down and comes up again, subsequently. Assuming these 10 numbers to be $\alpha 1, \ldots, \alpha 10$. The node uses this to create a function of the form:

$fi(x)=(x-\alpha 1)(x-\alpha 2) \ldots (x-\alpha 10)$

Here, the subscript i in $fi(x)$ merely indicates that the generated function is unique to each node. In one embodiment, $\alpha \min=\min(\alpha j, j=1, \ldots, 10)$, $\alpha \max=\max(\alpha j, j=1, \ldots, 10)$.

The node, when comes up, generates a unique Symmetric Key (Si), which is not shared with any other node. The signature consists of the following triple:

$UTC$timestamp>$x$>$fi(x)$>

Where, x is a random number generated in the interval [$\alpha \min, \alpha \max$]. Using x, the node computes fi(x). The node then encrypts the entire tuple using Si. The purpose of the node signature is for the node to authenticate upon request by any other node that the signature was indeed generated by the node.

According to one embodiment herein, a novel audit mechanism is used by nodes to perform audit on the coupon trail by verifying with another node if its signature in the coupon trail is authentic. The authentication process is a 2-step process: In the first step, the node uses Si to decipher the signature and generate the triple. The node also uses the value x to re-compute fi(x) and match it with the corresponding value in the triple. On successful completion of these two steps, the signature is said to be authenticated. Otherwise, it is termed as failed authentication. As fi(.) and Si are unique to the node and not shared with any other node, the authentication process is not performed by any other node. Thus, this process of authentication is secure and offers a very high degree of confidence.

According to one embodiment herein, a novel fault tolerance mechanism is used by a source vertex to reduce the time to collision, increase the number of leaders and increase resilience and tolerance to faults. This mechanism is referred to as "m-Ling" herein after in the present disclosure. The method for coupon generation further comprises using m-Ling on the generated coupons (610). In m-Ling, a source vertex generates multiple CRWs for each piece of work that needs to be done (e.g., each set of transactions to be processed). Thus, instead of initiating one CRW for each piece of work that needs to be done, in m-Ling, m (m>1) simultaneous CRWs are initiated by the source vertex. All the coupons (L- and R-coupons) carry the same walk identifier. The m-Ling mechanism is available in 3 variants namely Distinct, Non-Distinct and Hybrid. Each of these variants offers a set of benefits.

According to one embodiment herein, in case of "non-distinct" variant of the m-Ling, the match data in the m L-coupons are identical. Similarly, the corresponding match data in all the m R-coupons are identical. This means that, even though there need be m distinct collisions (as any L-coupon in that in-Ling is possibly matched with any R-coupon in that m-Ling) the probability of a collision increases many-fold. The primary benefit, besides improved fault tolerance, is a much shorter time to match, which makes the process of leader election much faster. The first leader is elected very quickly, and a small number of leaders (typically m/2) get elected within a very short period. This is typically faster than a single CRW by an order of approximately $m^2$.

According to one embodiment herein, in case of "distinct" variant of the Ling, the match data in the in L-coupons are different. Similarly, the corresponding match data in all the in R-coupons are different. This means that there need to be in distinct collisions, increasing the probability of electing a leader. This is also typically faster than a single CRW by an order of m. The primary advantage of the non-distinct m-Ling is that it is fairer and provides a larger set of leaders in a shorter period. In one example embodiment, for electing l leaders, m is set to m=l+3.

According to one embodiment herein, in case of "Hybrid" variant of the m-Ling, the source vertex initiates k (k<m) distinct CRWs and (m-k) non-distinct CRWs. This brings the benefits of both the distinct and non-distinct m-Ling types and allows a source vertex to tweak the value of k to achieve trade-offs between time to leader election and number of leaders elected. To prevent flooding of the network, the field maxHops is set to a much smaller number, typically 10N.

According to one embodiment herein, the method for coupon generation still further comprises sending the coupons to the coupon forwarding module (712).

Figure 8:
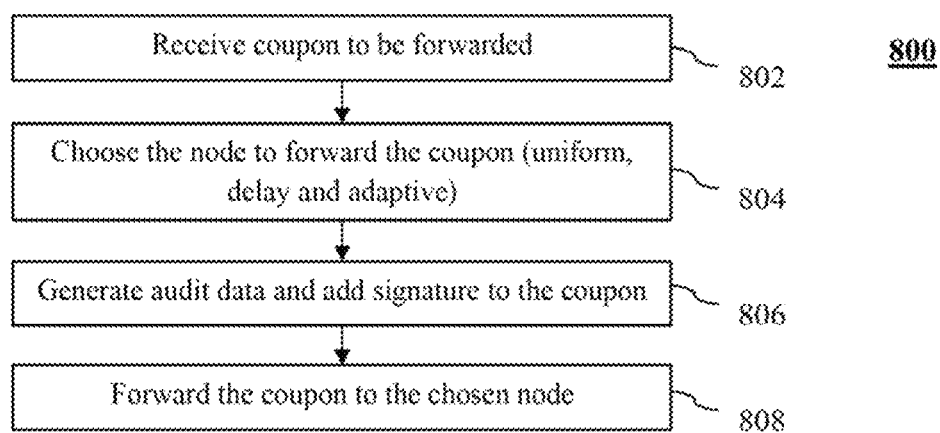
FIG. 8 illustrates a flowchart explaining a method of coupon forwarding, according to one embodiment herein.

FIG. 8 illustrates a flowchart explaining a method of coupon forwarding, according to one embodiment herein. With respect to FIG. 8, the coupon to be forwarded is received by the forwarding module 204 (802). The method also comprises choosing the node to forward the coupon (804). The node is chosen at random from the connected neighbours. The method further comprises generating, audit data and adding signature to the coupon (806). The method still further comprises forwarding the coupon to the chosen node (808).

Figure 9:
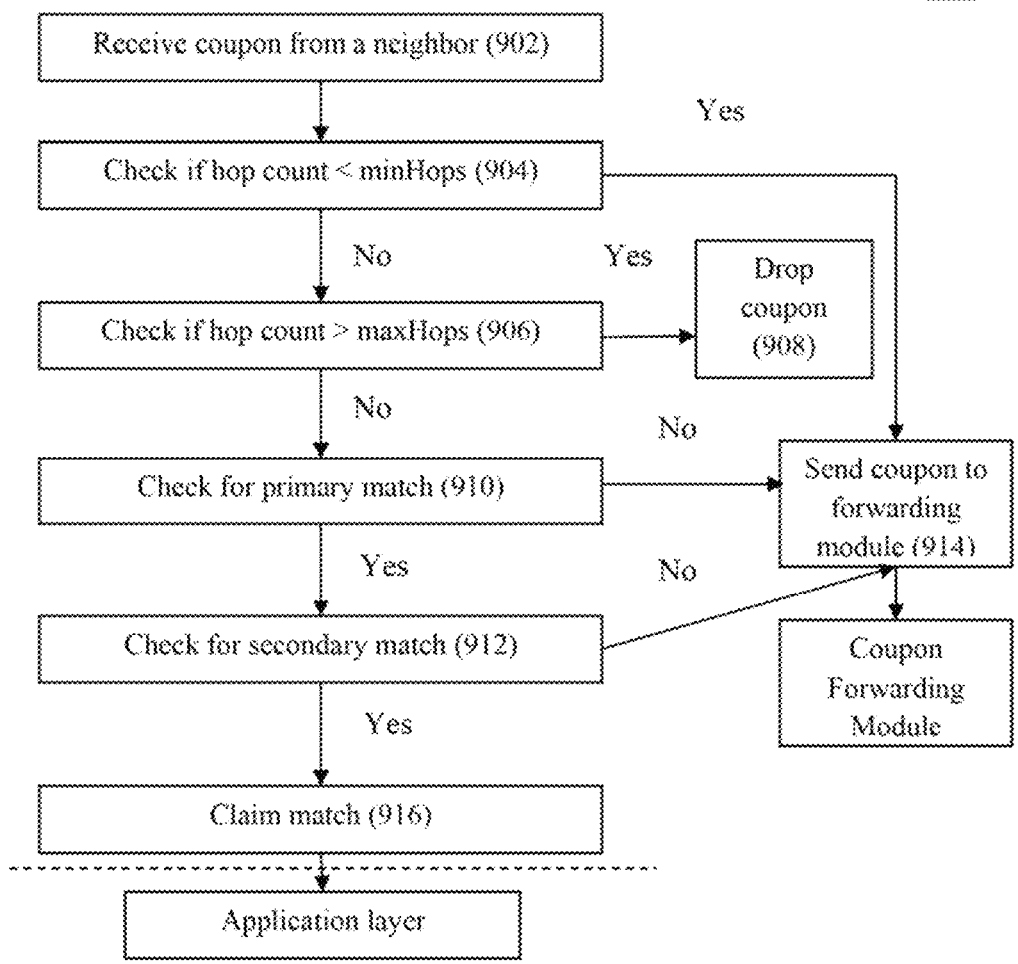
FIG. 9 illustrates a flowchart explaining a method of coupon matching, according to one embodiment herein.

FIG. 9 illustrates a flowchart depicting a method for coupon matching, according to one embodiment herein. With respect to FIG. 9, the coupon is received from a neighbour by the coupon matching module (902). The method also comprises checking if the hop count is less than the minimum number of hops specified in the coupon structure (904). If not, then the method further comprises checking if the hop count is greater than the maximum number of hops specified in the coupon structure (906). If yes, the coupon is dropped (908). If not, then the primary match is checked (910). However, when the hop count is less than the minimum number of hops specified in the coupon structure or the primary match is not found then the coupon is sent to the forwarding module (914). When the primary match is found then the coupon is checked for secondary match (912). If yes, then the match is claimed (916) and the coupon is forwarded to application layer for further processing. However, when the secondary match is not found, then the coupon is sent to forwarding module (914).

The various embodiments herein provide a novel leader election mechanism in distributed system that is randomized in twin dimensions of space and time using the concept of a colliding random walk. The system and method uses colliding random walks for leader election. Two coupons (Left and Right) are generated in the embodiment herein in a quantum resistant manner for making the system more secure. As Quantum computers cannot to decipher the counterpart of the coupon given the knowledge of one of the coupons. The embodiment herein also uses a novel fault tolerance mechanism "m-Ling" that enables identification of more than one leader for the same coupon set.

The system and method of the embodiments herein are simple, fast, fair, robust, efficient, lightweight and secure. The mechanism guarantees election of a leader even in the presence of failures. This mechanism is suitable for use in distributed systems that, need to handle high volumes, variety and velocity of data in a real time manner. Thus, the system and method is, suitable for use in industrial IoT (Internet of Things) applications that have huge number of constrained devices such as IoT based supply chain, smart grid etc. The system and method is also suitable for use in high speed high volume decentralized online platforms used in online retail sector.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments.

It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A system for leader election in distributed networks, the system comprises:
a peer-to-peer distributed network comprising a plurality of nodes connected over a communication network, wherein each node in the network is configured to communicate with one or more nodes in the plurality nodes in the network over a bi-directional communication link;
a coupon generation module, implemented by a processor, provided in each node within the network, wherein the coupon generation module is configured for generating one or more software coupons, and wherein each software coupon comprises a pair of Left (L) and Right (R) coupons, and wherein each pair of L and R coupons comprises a hash value part/match data, one or more identifiers and a hop count value, and wherein the coupon generation module is further configured for using a fault tolerant mechanism, by generating more than one pair of coupons for a unit of work, and wherein each pair of generated L and R coupons carries the same walk identifier;
a coupon forwarding module, implemented by a processor, coupled to the coupon generation module, wherein the coupon forwarding module is configured for initiating a colliding random walk (CRW) by forwarding all the pairs of L and R coupons, each L and R coupon representing a simple random walk (SRW), generated by a source node by selecting two neighboring nodes at random and forwarding the L coupon to the first node and the R coupon to the second node; and
a coupon processing module, implemented by a processor, coupled to the coupon forwarding module, wherein the coupon processing module is configured for processing the received L and R coupons to identify a potential match/primary match of the L and R coupons, and wherein the coupon processing module is further configured for verifying potentially matched L and R coupons using one or more identifiers to determine an exact match/secondary match, and wherein the receiving node with exactly matched L and R coupons is identified as a leader node and gains the right to perform a specific task.

2. The system according to claim 1, wherein the fault tolerance mechanism, is configured for providing any one option of increasing probability of leader election, increasing the number of leaders elected or achieve trade-off between time to leader election and number of leaders elected using one or more variants of the fault tolerance mechanism, and wherein the one or more variants are identified as distinct, non-distinct and hybrid variant respectively.

3. The system according to claim 2, wherein the distinct variant of the fault tolerance mechanism is configured for providing fair and more number of elected leaders by setting mutually different match data in the L coupons and corresponding match data in the R coupons, and wherein setting different match data in each of the L and R coupons requires an equal number of collisions, thereby increasing the probability of leader election.

4. The system according to claim 2, wherein the non-distinct variant of the fault tolerance mechanism is configured for increasing the probability of collision for faster leader election by setting match data in L coupons and corresponding match data in R coupons as identical, and wherein setting identical match-data in L and R coupons enables any L coupons to be matched with any R coupons, thereby increasing the probability of leader election.

5. The system according to claim 2, wherein the hybrid variant of the fault tolerance mechanism is configured for increasing resilience and tolerance to faults and achieve trade-offs between time to leader election and number of leaders elected by setting the source node/vertex to initiate a set of distinct CRWs and remaining non-distinct CRW's.

6. A computer implemented method comprising instructions stored on a non-transient computer readable storage medium and executed on a hardware processor in a computer system for leader election in distributed systems through a plurality of algorithms, the method comprising the steps of:

> selecting one or more source nodes in a distributed system;
>
> generating one or more software coupons by each source node using a coupon generation module, implemented by a processor, wherein each software coupon comprises a pair of Left (L) and Right (R) coupons, each L and R coupon representing a simple random walk (SRW);
>
> forwarding, the one or more pairs of L and R coupons (SRW) generated by the source node in the network using a coupon forwarding module, implemented by a processor, to neighbouring nodes by initiating a colliding random walk (CRW) for each pair of L and R coupons, and wherein each CRW comprises one L coupon and one R coupon, and wherein the L and R coupons corresponding to the plurality of CRW's carry the same walk identifier;
>
> processing the received L and R coupons at each node to identify a potential match/primary match of the L and R coupons by comparing the received L and R coupons;
>
> forwarding the potentially matched L and R coupons to a matching algorithm to determine an exact match/secondary match between the L and R coupons; and
>
> claiming a match when L and R coupons with the same walk identifier are received at a node simultaneously.

7. The method according to claim 6, wherein the step of simultaneously generating the pairs of software coupons further comprises using one or more variants of L and R coupons, and wherein the one or more variants comprises distinct, non-distinct and hybrid variants, and wherein the use of distinct, non-distinct and hybrid variants increases the probability of leader election, increases the number of leaders elected and achieves trade-off between time to leader election and number of leaders elected respectively.

8. The method according to claim 7, wherein the step of generating pairs of software coupons comprises setting the match data in L coupons and corresponding match data in R coupons as identical in the case of a distinct variant and as different in case of the non-distinct variant.

9. The method according to claim 7, wherein the step of generating pairs of software coupons using the hybrid variant comprises setting the source node/vertex to initiate a set of distinct CRWs and remaining non-distinct CRW's.

10. The method according to claim 6, wherein the step of software coupon matching further comprises:

> checking a hop count of each pair of L and R coupons and forwarding the L and R coupons to the forwarding module when the hop count is less than a minimum number of hops specified in the coupon structure;
>
> dropping the L and R coupons when the hop count is greater than the maximum number of hops specified in the software coupon structure;
>
> checking the L and R coupon for a primary match when the software coupon is not dropped;
>
> sending the L and R coupon to the forwarding module when the hop count is less than the minimum number of hops specified in the software coupon structure or the primary match is not found;
>
> checking the L and R coupon for a secondary match when the primary match is found;
>
> sending the L and R coupons to the forwarding module when the secondary match is not found; and
>
> claiming a match when the secondary match is found and forwarding the L and R coupons to an application layer for further processing.

11. The method according to claim 6, wherein the method further comprises a step of performing an audit by each node in the network, using an audit mechanism, and wherein the audit is performed on the L and R coupon trail by verifying with another node if its signature in the L and R coupon trail is authentic.

\* \* \* \* \*